April 18, 1967  S. L. HARDCASTLE  3,314,112
MULTI-PLATE MOLDING MACHINE AND INDEXING
MECHANISM THEREFOR
Filed March 27, 1964  2 Sheets-Sheet 1
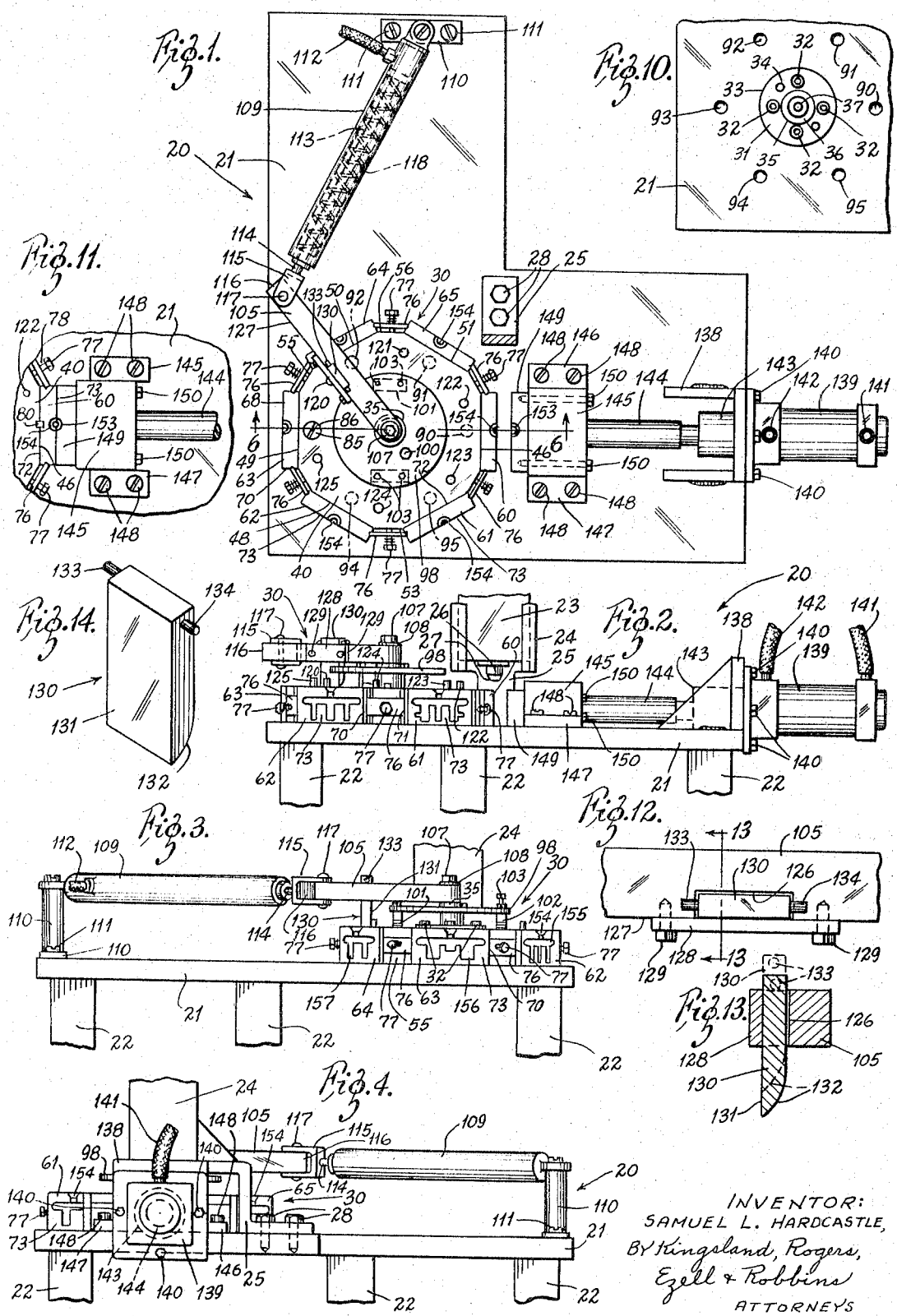
INVENTOR:
SAMUEL L. HARDCASTLE,
BY Kingsland, Rogers,
Ezell & Robbins
ATTORNEYS

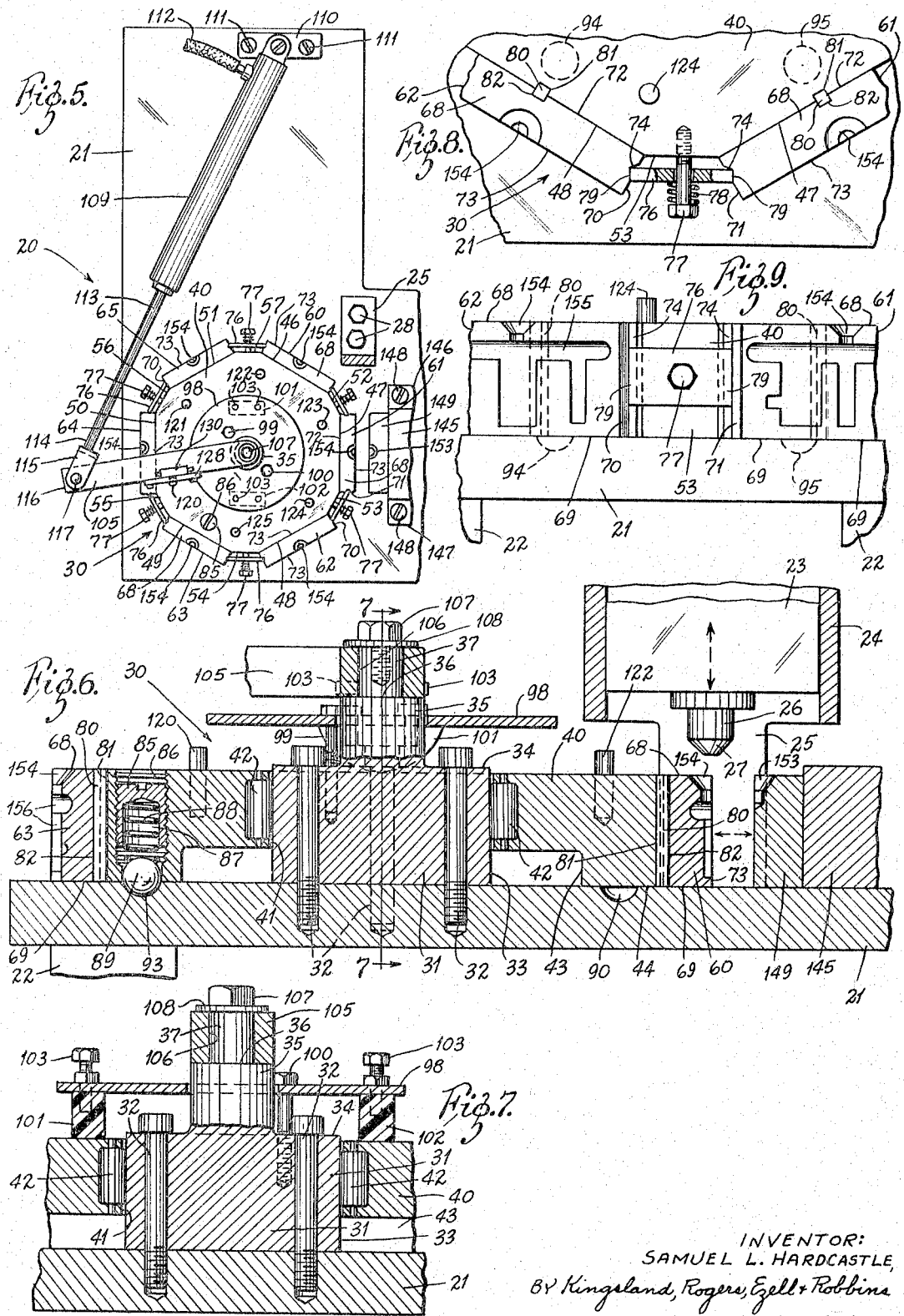

United States Patent Office 3,314,112
Patented Apr. 18, 1967

3,314,112
MULTI-PLATE MOLDING MACHINE AND INDEX-
ING MECHANISM THEREFOR
Samuel L. Hardcastle, 9380 Golden Gate,
St. Louis, Mo. 63144
Filed Mar. 27, 1964, Ser. No. 355,267
6 Claims. (Cl. 18—30)

This invention relates to a molding machine, and particularly to a molding machine having a plurality of mold plates with a mechanism for indexing those mold plates sequentially into position for a molding operation.

In general, the invention comprises a rotary disk mounted adjacent the injection nozzle of a molding machine. The disk may have any number of faces on its side with a mold plate mounted against each face. As the disk rotates through increments, each mold plate is brought successively into position beneath the mold head. Opposite this position, there is a single mold plate with a mechanism for driving the single mold plate into contact with the mold plate that has rotated into molding position. Thus, as the disk is rotated through arc increments, successive mold plates mounted on it are moved into molding position, and different objects are molded depending upon the design of the cavities in such successive mold plates.

The indexing of the disk through these arc increments is done by a swing arm which is driven by the timed operation of an air cylinder. The swing arm revolves about a shaft that is coaxial with the disk, and the stroke of the swing arm is such as to produce the proper arc increment of rotation. The swing arm carries a wedge plate and there are pins projecting above the upper surface of the disk in the path of this wedge plate. When the swing arm is driven by the air cylinder, the wedge plate contacts one of the pins and causes the disk to rotate. To assure the proper arc, and to stop the disk at the proper time, there is a spring biased ball carried by the disk that drops into a recess each time the disk rotates through the proper arc increment.

The general object of this invention is to provide a low cost molding machine having a plurality of mold plates which may be provided with different designed mold cavities, together with a mechanism for indexing the mold plates successively into position for a molding operation.

Another object of the invention is to provide a multi-cavity molding machine for receiving a plurality of mold plates and for moving the mold plates successively into position for a molding operation, the machine being so designed that very inexpensive mold plates can be used.

Another object of the invention is to provide a molding machine having a movable member upon which a plurality of mold plates may be releasably mounted and by which the mold plates can be successively moved into position for a molding operation, together with means for mounting the mold plates such that any one may be removed and replaced by another mold plate without interrupting the operation of the machine.

Still another object of the invention is to provide a molding machine with a movable member upon which mold plates are mounted and by which the mold plates are moved successively into position for a molding operation, with means to accurately position the movable member so that the indexing of the movable member can be entirely automatic.

Other objects and advantages will be apparent to those skilled in the art.

In the drawings:

FIGURE 1 is a top plan view of the machine with the injection molding apparatus broken off;

FIGURE 2 is a fragmentary front elevation view of the machine;

FIGURE 3 is a fragmentary side elevation view of the machine as viewed from the left side of FIGURE 1;

FIGURE 4 is a fragmentary side elevation view of the machine as viewed from the right side of FIGURE 1;

FIGURE 5 is a fragmentary top plan view of the machine similar to that of FIGURE 1, but with the indexing mechanism in an actuated condition;

FIGURE 6 is a view in section on an enlarged scale taken along the line 6—6 of FIGURE 1;

FIGURE 7 is a view in section taken along the line 7—7 of FIGURE 6;

FIGURE 8 is an enlarged fragmentary top plan view of the cavity plates and supporting disks, particularly illustrating the mechanism for attaching the cavity plates to the supporting disk;

FIGURE 9 is a fragmentary front elevation view of the cavity plates, supporting disk and attaching mechanism of FIGURE 8;

FIGURE 10 is a fragmentary top plan view of the base of the machine with the cavity supporting disk removed;

FIGURE 11 is a fragmentary top plan view of a portion of the disk and of the mold cavity plate which is in position for a molding operation, and showing the opposing master plate moved to the position for closing the mold cavity;

FIGURE 12 is an enlarged fragmentary top plan view of the swing arm and indexing wedge;

FIGURE 13 is a view in section taken along the line 13—13 of FIGURE 12; and

FIGURE 14 is an isometric view of the indexing wedge.

Referring now to the drawings and first to FIGURE 2, this machine 20 has a horizontal base or platform 21 supported by a plurality of legs 22 on the floor of a building. All parts of the machine may be supported on the base or platform 21. FIGURE 2 shows the lower end of an injection molding head 23. The specific construction of the injection molding apparatus to which the head 23 is connected is not a part of this invention except for certain aspects which are involved in the overall combination. It is worth noting that the head 23 is vertically reciprocable in a frame 24 that is mounted by an extension 25 to the base 21. The head 23 has an outlet fitting or nozzle 26 that has an annular tapered lowered end 27 surrounding the outlet from which injected plastic flows. The extension 25 is secured to the base by bolts 28.

A mold cavity support and indexing assembly 30 is mounted on the base or platform 21. In this assembly, a bearing block 31 is fastened by a plurality of bolts 32 to the base 21. The bearing block 31 has a cylindrical side wall 33, and it has a top surface 34 with an upwardly extending hub 35 in the center thereof. The hub 35 has a flat upper surface 36 with a short cylindrical shaft 37 extending upwardly from its center. The shaft 37 is coaxial with the bearing block 31.

A mold cavity supporting disk 40 is mounted on the base 21, surrounding the bearing block 33. The disk 40 has a hole 41 through its center of larger diameter than that of the bearing block 34, and a plurality of roller bearings 42 are mounted on the disk 40. The bearings 42 rotate on vertical axes with their surfaces projecting inwardly of the hole 41. The surfaces of these roller bearings 42 maintain contact with the cylindrical side 33 of the bearing block 31.

The inner lower portion 43 of the disk 40 is cut away to reduce the width of the lower outer surface 44 that rests upon the base 21.

The disk 40 has a plurality of flat vertical side walls 46, 47, 48, 49, 50 and 51. Six of these walls 46–51 are illustrated, but there may be a different number if desired. These walls 46–51 are joined by short flat walls 52, 53, 54, 55, 56 and 57.

A plurality of mold plates 60, 61, 62, 63, 64 and 65 are mounted against the respective vertical walls 46–51 on the disk 40. Each mold plate 60–65 has a top wall 68, a bottom wall 69, side walls 70 and 71, a back wall 72, and a front face 73. Each mold plate also has a vertical notch 74 in each of its side walls 70 and 71.

There are a plurality of retainer plates 76 each mounted on a bolt 77 threaded into one of the short walls 52–57. Each retainer plate 76 is slidable on its bolt 77, and is biased by a compression spring 78 toward the opposing short wall 46 or 47, etc. As particularly shown in FIGURES 8 and 9, each retainer plate 76 has side edges 79 that fit within the notches 74 in the sides of the mold plates 60–65. The force of the springs 78 are sufficiently strong to press the retainer plates 76 firmly against the notches 74 and hold the mold plates 60–65 against the walls 46–51 of the disk 40.

Each mold plate 60–65 is held against lateral sliding by a keeper 80 held within cooperating grooves 81 and 82 in the disk 40 and the mold plates. The keeper 80 may be wholly removable or it may be permanently mounted within the groove 81 in the disk 40.

A ball retainer 85 is threaded into a hole 86 in the disk 40. The ball retainer 85 has a recess 87 in its lower end that serves as a spring seat and guide for a compression spring 88. The lower end of the spring 88 bears against a ball 89. There are a plurality of recesses 90, 91, 92, 93, 94 and 95 in the base 21 corresponding in number to the number of mold plates 60–65. Each recess 90–95 forms a segment of a hollow sphere, and is in the path of the ball 89 as it rotates with the disk 40. The recesses 90–95 are positioned to receive the ball when the disk 40 is in the position illustrated in FIGURE 1, with a mold plate, such as the mold plate 60, below the injection nozzle 26.

A plate 98 is mounted above the bearing block 31 by a pair of bolts 99 and 100. A pair of Teflon blocks 101 and 102 are fastened by bolts 103 to the plate 98. The Teflon blocks 101 and 102 have curved lower surfaces that rest upon the top of the disk 40. The Teflon blocks 101 and 102 do not apply pressure against the disk 40 but do hold it in contact with the base 21 as the disk rotates.

The means to rotate the disk 40 include a swing arm 105 which has a hole 106 in one of its ends for mounting the swing arm on the shaft 37. A bolt 107 is threaded into the upper end of the short shaft 37, and the bolt 107 holds a washer 108 against the top of the swing arm 106. The fit, however, is not tight, and the swing arm can rotate freely about the shaft 37.

An air cylinder 109 is pivotally mounted on a bracket 110 that is fastened by screws 111 to the base 21. The air cylinder 109 is of conventional construction, having an air hose 112 connected to it and leading from a valve controlled air supply (not shown). The valve, which is not shown, is of the conventional type which admits air to the cylinder 109 or withdraws air from the cylinder 109 depending upon actuation of the valve.

A rod 113 is slidable in the air cylinder 109. The rod 113 has an end 114 projecting beyond the free end of the cylinder 109 with a bifurcated bracket 115 connected to it. The bifurcated bracket 115 is pivotally mounted to the free end 116 of the swing arm 105 by a pin 117. When the hose 112 admits air to the cylinder 109, the rod 113 is propelled outwardly from the cylinder 109, causing the swing arm 105 to rotate in a counterclockwise direction about the short shaft 37, as viewed in FIGURE 1. When air is allowed to escape from the cylinder 109 through the hose 112, the rod 113 is returned by a compression spring 118 mounted within the cylinder 109.

There are a plurality of pins 120, 121, 122, 123, 124 and 125 connected to the disk 40 and projecting above its upper surface. A recess 126 is cut in the leading side 127 of the swing arm 105. The open side of the recess 126 is blocked by a bar 128 fastened by a pair of bolts 129 to the swing arm 105. The recess 126 and the plate 128 thus define a rectangular opening within which an indexing wedge 130 slides. As shown particularly in FIGURE 14, the indexing wedge 130 has a flat forward face 131 and a curved lower rearward side 132. A pair of pins 133 and 134 project laterally outwardly from opposite sides of the indexing wedge 130 adjacent its top. These pins 133 and 134 normally rest on the top of the swing arm 105 and support the indexing wedge 130 within the rectangular opening defined by the recess 126 and the plate 128 (see FIGURE 12).

There is a pin 120–125 for each mold plate 60–65. When the rod 113 is retracted and the swing arm 105 occupies the position of FIGURE 1, one of these pins, such as the pin 120, occupies a position just in front of the face 131 on the indexing wedge 130. When the pin 120 is there, the mold plate 60 occupies the position illustrated in FIGURE 1. The stroke of the rod 113, when air is admitted to the cylinder 109, is such that the swing arm 105 rotates through an arc that will drive the pin 120 from the position illustrated in FIGURE 1 to the position occupied by the pin 125. This would put the pin 121 in the position occupied by the pin 120 in FIGURE 1. Compare the position of the disk 40 as illustrated in FIGURE 5 to the position as illustrated in FIGURE 1.

When air is released from the cylinder 109 and the spring 118 returns the rod 113, the swing arm 105 is drawn back to the position illustrated in FIGURE 1. When the curved surface 132 on the indexing wedge 130 contacts the pin 121 that has been moved to the position previously occupied by the pin 120, the indexing wedge 130 is biased upwardly to the dotted line position illustrated in FIGURE 13 and rides over the pin 121 until it drops down behind the pin 121. Then the indexing mechanism is ready for another indexing operation.

There is a bracket 138 welded to the base 21. An air cylinder 139 is fastened to the bracket 138 by a plurality of bolts 140. The cylinder 139 has inlet and outlet air hoses 141 and 142 connected to it, and these are connected through valves to an appropriate air supply (not shown) for supplying and exhausting air to the cylinder 139. A portion 143 of the stationary cylinder 139 extends through the bracket 138, as illustrated in FIGURE 1. There is a shaft 144 slidable within the cylinder 139 and projecting beyond the end 143 thereof. A block 145 is fastened to the end of the shaft 144. The block is slidable between stationary guides 146 and 147 fastened to the base 21 by screws 148. A mold plate 149 is fastened to the block 145 by bolts 150.

When air is admitted to the cylinder 139, it forces the shaft 144 to the left, as viewed in FIGURE 1, pressing the mold plate 149 against the opposing mold plate 60. When air is released from the cylinder 139, the shaft 140 is drawn back to the position illustrated in FIGURE 1.

The mold plates 60–65 and 149 are of cast aluminum, and are therefore very inexpensive. The mold plate 149 is made with half a beveled sprue inlet 153 leading from its upper surface. Each of the other mold plates 60–65 is made with the other half of a beveled sprue inlet 154. When the mold plate 148 is brought against a mold plate 60–65, the half sprue inlets 153 and 154 meet to close the sprue inlet.

The construction of this machine permits the use of mold plates 60–65 having different mold cavity designs. When such different mold plates are used, the mold cavity is wholly in the plates 60–65, and the mold plate 149 is flat-faced except for the sprue inlet 153. Thus, as shown in FIGURE 3, the mold plate 62 has one cavity design 155, the mold plate 63 has another cavity design 156, and the mold plate 64 has still another cavity design 157. When the mold plate 149 is pressed against the front face 73 of one of the mold plates 60–65, the mold cavity is closed.

Of course, if the mold plates 60–65 are to have identical cavity designs in them, parts of the cavity may be in the mold plates 60–65 and the other part in the mold plate 149.

Although they are not illustrated, various valves and operating mechanisms have been mentioned. These include the valves which control the supply of air to the air cylinder 109 and the valves which control the supply of air to the air cylinder 139. It has also been mentioned that the extruder head 23 is movable vertically within its frame 24. There is a mechanism which produces this movement, causing the extruder head to move from the position illustrated in FIGURE 2 to a lower position in which the beveled nozzle wall 27 contacts the beveled sprue inlet 153–154. Those skilled in the art will recognize that these valves and control mechanisms are conventional and will recognize that their sequential timing, as will be described, is accomplished by conventional timer apparatus.

Operation

With the mold plate 149 fastened to the block 145 for actuation by the air cylinder 139, selected mold plates 60–65 may be mounted on the rotatable disk 40. These mold plates 60–65 are easily installed by pulling the spring biased retainer plates 76 toward the heads of the bolts 77 and then releasing them against the grooves 74 in the sides of the mold plates. If the keys 80 are removable, they are replaced to prevent lateral sliding of the mold plates 60–65.

Assuming the machine is in the condition illustrated in FIGURE 1, a mold plate 60 is in position for a molding operation. The timing mechanism which is not shown causes air to be admitted to the hose 141 in the cylinder 139 to drive the shaft 144 in the mold plate 149 to the left against the face of the mold plate 60. This is followed by actuation of the operating mechanism controlling the molding head 23, which moves the molding head downwardly until the beveled lower end 27 of the injection nozzle 26 bears against the sprue inlet 153–154.

When plastic has been injected to fill the mold cavity provided in the mold plate 60, and the plastic has set, all taking a few seconds, the operating mechanism raises the mold head 23, and air from the cylinder 139 is released through the hose 142, drawing the mold plate 149 back to the position illustrated in FIGURE 1. Immediately the timing mechanism causes the indexing assembly to operate.

To index the disk 40 and move the next mold plate 61 into position for a molding operation, air is supplied to the cylinder 109 through the hose 112. This air extends the rod 114 and causes the swing arm 105 to revolve about the short shaft 37. As the swing arm 105 revolves, the front face 131 of the wedge plate 130 drives the pin 120 and causes the disk 40 to rotate in a counterclockwise direction, until the pin 120 reaches the position previously occupied by the pin 125. The length of the stroke of the rod 114 causes the correct angle of rotation of the disk 40. Also, when the pin 120 reaches the position previously occupied by the pin 125, the spring biased ball 89 also reaches the recess 32 and is biased into that recess. Thus, the ball 89 acts as a positive stop to accurately position the disk 40 for the next molding operation.

The timing mechanism immediately causes air to be exhausted through the hose 112 so that the spring 118 returns the rod 114 to its position as illustrated in FIGURE 1, the wedge plate 130 being cammed over the next pin 121 by its curved lower surface 132. The wedge plate 130 then drops behind the pin 121, and the wedge plate and the swing arm 105 are then in position for the next indexing operation. The mold plate 61 is now in position opposite the mold plate 149 and ready for another molding operation. This occurs as previously described with the mold plate 149 being driven against the face of the mold plate 61 and the molding head 23 being driven down for the injection of plastic into the mold cavity.

Various changes and modifications may be made within the purview of this invention as will be readily apparent to those skilled in the art. Such changes and modifications are within the scope and teaching of this invention as defined by the claims appended thereto.

What is claimed is:

1. A molding machine comprising a base, a molding head, means mounting the molding head for vertical reciprocation between lower and upper positions, an injection nozzle supported on the lower side of the mold head, a disk rotatably supported by the base on a vertical axis of rotation, a plurality of mold plates mounted on the sides of the disk, a separately mounted mold plate slidable on the base, means to slide the separately mounted mold plate into and out of contact with successive ones of the plurality of mold plates depending upon their rotational position, a mold cavity being defined when the separately mounted mold plate contacts one of the plurality of mold plates with a sprue opening communicating with the cavity, means to rotate the disk through incremental arcs to move the plurality of mold plates successively into positions opposite the separately mounted mold plate, and means to reciprocate the molding head to its lower positions in which the injection nozzle introduces moldable material through the sprue opening to the mold cavity and to thereafter reciprocate the molding head to its upper position to permit free rotation of the disk.

2. The molding machine of claim 1 wherein the disk and base constitute two relatively moving parts in continuous contact when the disk rotates and including a spring biased ball in one of the parts and a plurality of cavities in the other part, the ball and cavities constituting stop means for releasably locking the disk in each of the positions to which it is moved by the rotating means.

3. In a molding machine having a molding station with means to fill the cavity of a mold positioned at the molding station, a base, a movable member supported by the base, a plurality of mold plates supported by the movable member, means for moving the movable member to move the mold plates sequentially past the molding station, each mold plate having a laterally projecting shoulder on each of its opposite sides, a plate between each pair of adjacent sides of each pair of mold plates, means supporting each plate for sliding movement toward and away from the shoulders between which such plate is mounted, and a spring for biasing the plate against the shoulders, whereby the plate may be withdrawn against the force of the spring and any mold plate may be quickly removed or replaced.

4. In a molding machine having a base and having means to inject moldable material, a disk rotatably supported upon the base, means to rotate the disk about a vertical axis, a plurality of mold plates, means for mounting the plurality of mold plates against the vertical sides on the disk, the disk being so positioned relative to the injecting means that, as the disk rotates, the mold plates are moved successively beneath the injecting means, a cavity in each mold plate, means to close the cavities of at least that mold plate which occupies a position beneath the injecting means, the means to rotate the disk comprising a swing arm having an end mounted about a pivot coaxial with the axis of rotation of the disk and having a free end opposite thereto, an air cylinder supported by the base and having a rod reciprocable relative thereto depending upon the supply of air to the air cylinder, an end of the rod being connected to the free end of the swing arm, a plurality of pins projecting above the disk, a wedge plate carried by the swing arm and adapted to engage one of the pins to rotate the disk when the swing arm is revolved by the air cylinder, the wedge plate having a camming surface for causing it to ride over any pin in its path when the swing arm is returned by the air cylinder.

5. The combination of claim 4, including a spring-biased ball movable beyond the lower surface of the disk, and a plurality of recesses in the base positioned to receive the ball when the mold plates successively occupy positions beneath the injecting means.

6. The combination of claim 4 wherein the mold plates are made of cast aluminum.

References Cited by the Examiner
UNITED STATES PATENTS

| | | | |
|---|---|---|---|
| 2,862,232 | 12/1958 | Rekettye | 18—20 XR |
| 3,181,202 | 5/1965 | Martelli et al. | 18—19 |
| 3,224,043 | 12/1965 | Lameris et al. | 18—12 XR |

J. SPENCER OVERHOLSER, *Primary Examiner.*

W. L. McBAY, *Assistant Examiner.*